United States Patent [19]

Wooldridge

[11] 4,427,106

[45] Jan. 24, 1984

[54] MEANS FOR SUPPORTING IDLER ROLLERS IN CONVEYOR SYSTEMS

[75] Inventor: Lawson C. Wooldridge, Stourbridge, England

[73] Assignee: Brockway Engineering Limited, England

[21] Appl. No.: 348,359

[22] Filed: Feb. 12, 1982

[30] Foreign Application Priority Data

Feb. 20, 1981 [GB] United Kingdom ............... 8105440

[51] Int. Cl.$^3$ ............................................. B65G 39/10
[52] U.S. Cl. .................................... 198/842; 474/199
[58] Field of Search ...................... 198/842, 856, 781; 474/199, 165

[56] References Cited

U.S. PATENT DOCUMENTS 3,667,589  6/1972  Constable ........................... 198/856
3,770,102 11/1973  DeGood ............................ 198/781
3,942,338  3/1976  Furlette et al. ................... 198/835 X Primary Examiner—John J. Love
Assistant Examiner—Paul A. Sobel
Attorney, Agent, or Firm—Kenway & Jenney

[57] ABSTRACT

Disclosed is a conveyor system including a plurality of idler rollers for supporting the return leg of an endless conveyor belt and extending across the full width thereof. Said rollers being carried for free rotation about axle shafts having end portions projecting outwardly of the rollers and located in support means within said frame. Each axle shaft support means being attached to the frame and including a bracket having formed therein a downwardly extending locating slot dimensioned to receive and retain the axle shaft. A reaction member extending outwardly of the frame provides a reaction surface parallel to the axle shaft for co-operation with a flat portion formed in the surface of a disc cam, eccentrically mounted on the end of the axle shaft, to resist rotation of the shaft when the shaft is engaged in the said slot. The flat portion forms a chord of the disc and is bisected by a line passing through the axis of rotation and the center of the disc. Forced rotation of the cam by the shaft, for example through seizure of the roller bearing, causes the shaft to move along said slot and to drop out of the open end thereof, whereby the idler roller moves out of contact with the conveyor belt and ceases to provide support therefor.

9 Claims, 4 Drawing Figures

U.S. Patent
Jan. 24, 1984
4,427,106
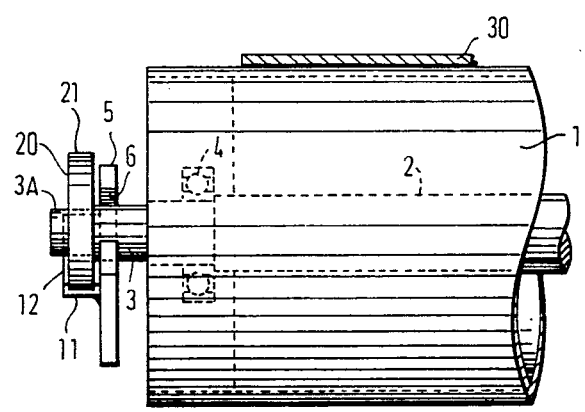
FIG. 1.
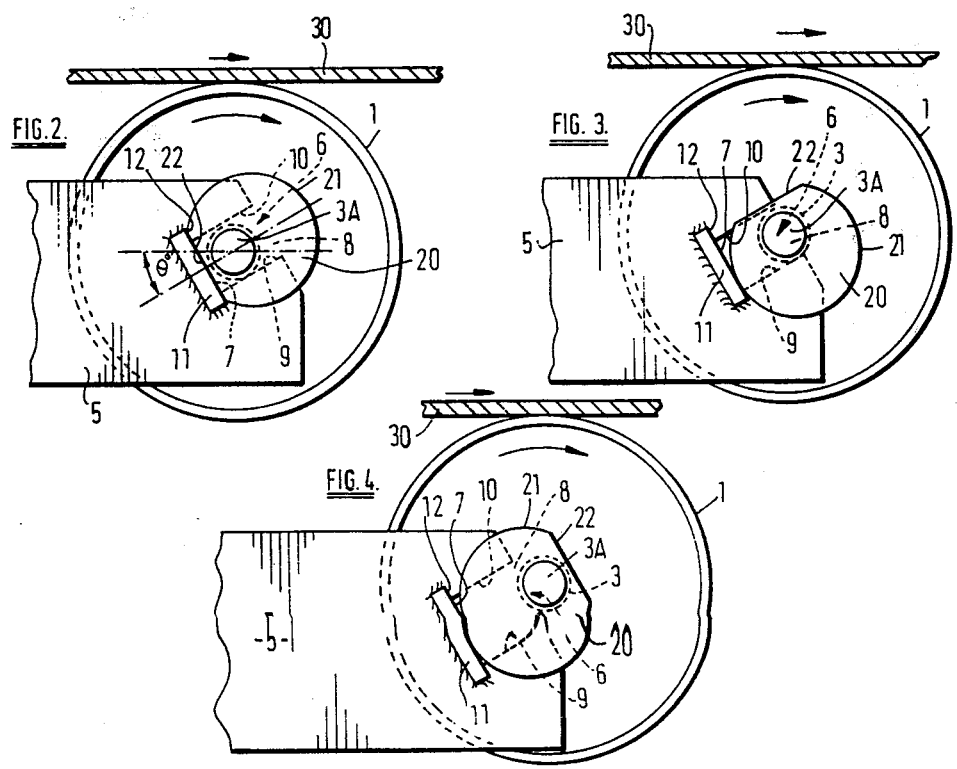
FIG. 2.
FIG. 3.
FIG. 4.

MEANS FOR SUPPORTING IDLER ROLLERS IN CONVEYOR SYSTEMS

BACKGROUND TO THE INVENTION

The present invention relates to an improved system of mounting idler roller assemblies in continuous belt conveyor systems.

Despite all efforts to prevent ingress of water, dirt and dust into the bearings on which idler rollers are mounted for rotation such substances, nevertheless, gain entry and frequently cause bearing failure. Such failure may result in overheating of the bearing affected to the extent that a fire is caused, an especially serious hazard when the conveyor is being used underground, for example in a coal mine.

A bearing failure generally requires that the conveyor line be halted till the particular idler roller assembly can be replaced, which may be inconvenient and cause substantial losses in production. Furthermore such bearing failures are frequently not noticed for some time during which the roller will be in an increasinly dangerous condition, ultimately, as mentioned above being the likely cause of a fire.

A method of automatically removing a roller with a failed bearing away from the conveyor belt would therefore be advantageous both from the point of view of safety and also of productivity, since it would enable the roller to be changed at a convenient opportunity.

SUMMARY OF THE INVENTION

We have now developed a means for mounting idler rollers, especially those supporting the return leg of a continuous conveyor belt, which allows for automatic removal of the roller from its mounting in the event of a bearing failure, thus significantly reducing the fire hazard and preventing undue wear on the conveyor belt.

Accordingly, therefore, the present invention provides a conveyor system, including a frame; a conveyor belt; a plurality of idler rollers in rolling contact with said conveyor belt to provide support therefor and supported within said frame on axle shafts having extending end portions engaging support means mounted on the frame, the said idler rollers being freely rotatable about said shafts, said support means including a bracket attached to the said frame and having formed therein a locating slot extending downwardly at an angle to the horizontal, the said slot having a closed lower end and being dimensioned to receive the said end portion of a shaft to support one said roller in said frame; a reaction member positioned adjacent the closed end of said slot and extending outwardly of said frame to provide a reaction surface substantially parallel to the axis of the said shaft, when the shaft is engaged in the said slot; a cam member non-rotatably carried on said extending end portion of said shaft for engagement with said reaction surface, said cam member having a maximum dimension at right angles to the shaft axis greater than the depth of said slot and having a portion of its surface engaging said reaction surface that cooperates therewith to resist rotation of the said cam when the shaft is engaged in the said slot, rotation of the said cam against said resistance moving the shaft along the said slot in the direction of the open end thereof to drop from said open end to disengage the shaft from the support bracket, whereby the roller supported by the said shaft moves out of contact with the said belt and ceases to provide support therefor.

Preferably the reaction surface of the reaction member is flat. Preferably also the cooperating surface of the cam is flat and the maximum dimension of the cam is a right angle to the said flat portion.

The cam is preferably in the form of a disc eccentrically mounted on the shaft and having a flat surface portion, forming a chord of the disc, for cooperation with the reaction surface, the axis of rotation of the cam lying on a diameter bisecting the said chord and positioned between the chord and the centre of the disc.

The idler rollers are preferably those used to support an unloaded conveyor belt on its return leg.

The idler roller axle shafts may be continuous shafts extending the length of the roller and projecting from each end or they may be in the form of stub axle shafts.

DESCRIPTION OF SPECIFIC EMBODIMENT

The invention will now be described more fully with reference to the accompanying diagrammatic drawings, which drawings illustrate one end of one idler roller carrying the return leg of a conveyor belt;

In the drawings:

FIG. 1 is a representation of the device for mounting one end of an idler roller.

FIG. 2 is a view from A in FIG. 1 in normal operating condition,

FIG. 3 is a view from A in FIG. 1 following part rotation of the cam member,

FIG. 4 is a view from A in FIG. 1 following rotation of the cam member through 180°.

Referring to FIGS. 1 and 2 of the drawings, an idler roller 1 is carried on an axle shaft 2 having a portion projecting outwardly therefrom. The shaft 2 projects outwardly from the opposite end of the roller (not shown), the mountings at each end being identical. Roller 1 is carried on the shaft 2 by a conventional ball bearing assembly 4.

Shaft 2 and its associated roller 1, is mounted in the frame (not shown) in bracket 5 in which is formed a locating slot 6 having a closed end 7 and open end 8. Said locating slot receiving and supporting, on its lower surface 9, end 3 of shaft 2.

A reaction member 11 is welded onto bracket 5 at right angles thereto to provide a flat surface 12 contiguous and parallel with the end portion 8 of slot 6 and extending either side thereof. A circular disc cam member 20 is non-rotatably mounted on stepped end 3a of end portion 3 of shaft 2, e.g. by press fitting. Cam 20 is mounted to have an eccentric axis and includes an outer surface 21 and a flat portion 22 forming a chord across the disc subtending the maximum angle at the cam axis. The diameter of cam 20 is dimensioned such that the distance between the cam axis and a point on the surface 21, on the line at right angles to flat 22, is greater than the length of the side 9 of slot 6. Flat portion 22 of cam 20 enages the surface 12 of member 11 when the idler roller is in the normal operating condition ie. when supporting a moving conveyor belt 13 as shown in FIG. 2.

In the event that bearing 4 fails, in which case it may seize or only allow rotation of roller 1 at high torque levels, the frictional action of belt 20 on roller 1 will apply a rotational torque to shaft 2 and hence to cam 20. When the torque applied is of sufficient magnitude, shaft 2 will be caused to rotate and the flat surface 22 of cam 20 will move off the flat surface 12 of reation member 11. Curved surface 21 of cam 20 will then contact said surface 12 causing the shaft 2 to move upwardly against side 9 of locating slot 6 as shown in FIG. 3. When the cam has rotated through about 180° as in FIG. 4, the shaft 2 will have moved beyond the open end 8 of locating slot 6 and will drop out of the bracket, thereby taking the roller 1 out of contact with belt 30. A cage (not shown) may conveniently be suspended between the mountings and below the roller to catch roller 1 as it drops out of the said bracket.

If the belt is moving in the opposite direction to that indicated in FIGS. 2 to 4, then following a bearing failure, once the necessary torque has been achieved to move surface 22 out of contact with surface 12 the shaft 2 will tend to move upwardly against side 10 of the locating slot 6 before being released therefrom through open end 8.

The cam 20 may, of course, be of any suitable shape, for example it may be rectangular and have its longest side normally in contact with flat 12 of reaction member 11.

The torque required to cause shaft 2 to rotate e.g. after bearing failure can be varied by varying the length of the flat portion 22 of cam 20 to suit rollers of differing weights and resistance to rotation caused by seal design variation.

Also the angle $\theta$ of locating slot 6 may be varied to suit different weights and resistances to rotation of the rollers.

Although the invention has been described with reference to the automatic disengagement of a roller from its support following, for example, a bearing seizure, manual rotation of the cam to cause disengagement is not excluded. Provision for manual rotation can be made by the inclusion of a member such as a handle attached to the cam such that movement of the member causes the cam to be rotated in the desired direction.

I claim:

1. A conveyor system including a frame; a conveyor belt; a plurality of idler rollers in rolling contact with said conveyor belt to provide support therefor and supported within said frame on axle shafts having extending end portions engaging support means mounted on the frame, the said idler rollers being freely rotatable about said shafts, said support means including a bracket attached to the said frame and having formed therein a locating slot extending downwardly at an angle to the horizontal, the said slot having a closed lower end and being dimensioned to receive the said end portion of a shaft to support one said roller in said frame; a reaction member positioned adjacent the closed end of said slot and extending outwardly of said frame to provide a reaction surface substantially parallel to the axis of the said shaft, when the shaft is engaged in the said slot; a cam member non-rotatably carried on said extending end portion of said shaft for engagement with said reaction surface, said cam member having a maximum dimension at right angles to the shaft axis greater than the depth of said slot and having a portion of its surface engaging said reaction surface that cooperates therewith to resist rotation of the said cam when the shaft is engaged in the said slot, rotation of the said cam against said resistance moving the shaft along the said slot in the direction of the open end thereof to drop from said open end to disengage the shaft from the support bracket, whereby the roller supported by the said shaft moves out of contact with the said belt and ceases to provide support therefor.

2. A conveyor system according to claim 1 wherein each said idler roller extends the full width of the conveyor belt and is supported at each end on axle shafts extending therefrom and engaging in said support means attached to said frame.

3. A conveyor system according to claim 2 wherein each said shaft carries a cam member for engagement with a reaction surface extending from said support means.

4. A conveyor system according to claim 3 wherein the said axle shafts are stub axles.

5. A conveyor system according to claim 3 wherein the open end of the said locating slot faces the direction of movement of the portion of conveyor belt in contact with the roller, whereby rotation of the said cam results in the shaft having a component of movement in the same direction of movement of the said belt.

6. A conveyor system according to claim 3 wherein the reaction surface is flat.

7. A conveyor system according to claim 6 wherein the portion of the surface of the said cam that cooperates with the reaction surface to resist rotation of the cam is flat and the maximum dimension of the said cam is diametrically opposite the said flat surface of said cam.

8. A conveyor system according to claim 7 wherein the cam is a disc carried by the shaft and having an axis of rotation concentric with said shaft, said flat portion forming a cord of said disc.

9. A conveyor system according to claim 7 wherein the cam is a disc and said flat portion forms a chord thereof the said disc being eccentrically mounted on said shaft and the axis of rotation lying on a diameter bi-secting the said chord and positioned between the said chord and the centre of the disc.

* * * * *